Jan. 7, 1930.  C. J. BOCK ET AL  1,742,749
GEAR SHIFTING MECHANISM
Filed Feb. 11, 1928    2 Sheets-Sheet 2
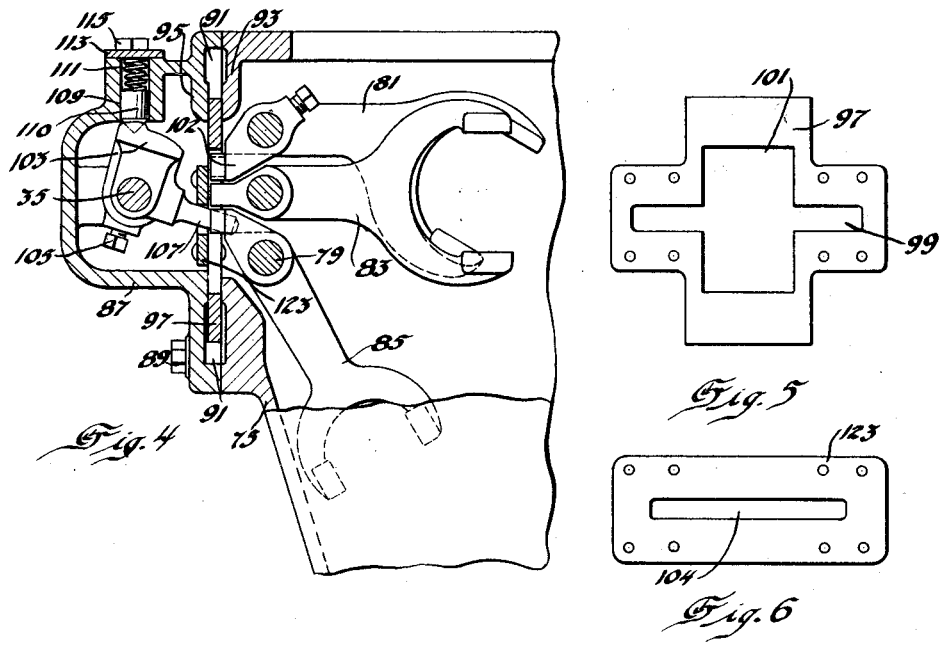
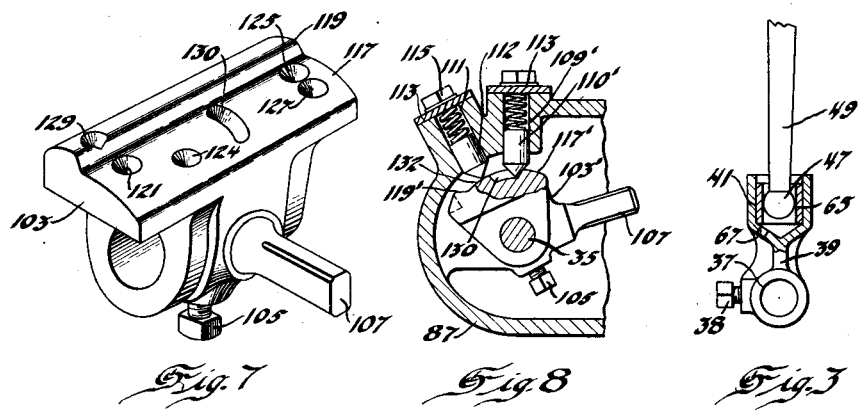
Inventors
Carl J. Bock &
Perry L. Jenney Patented Jan. 7, 1930

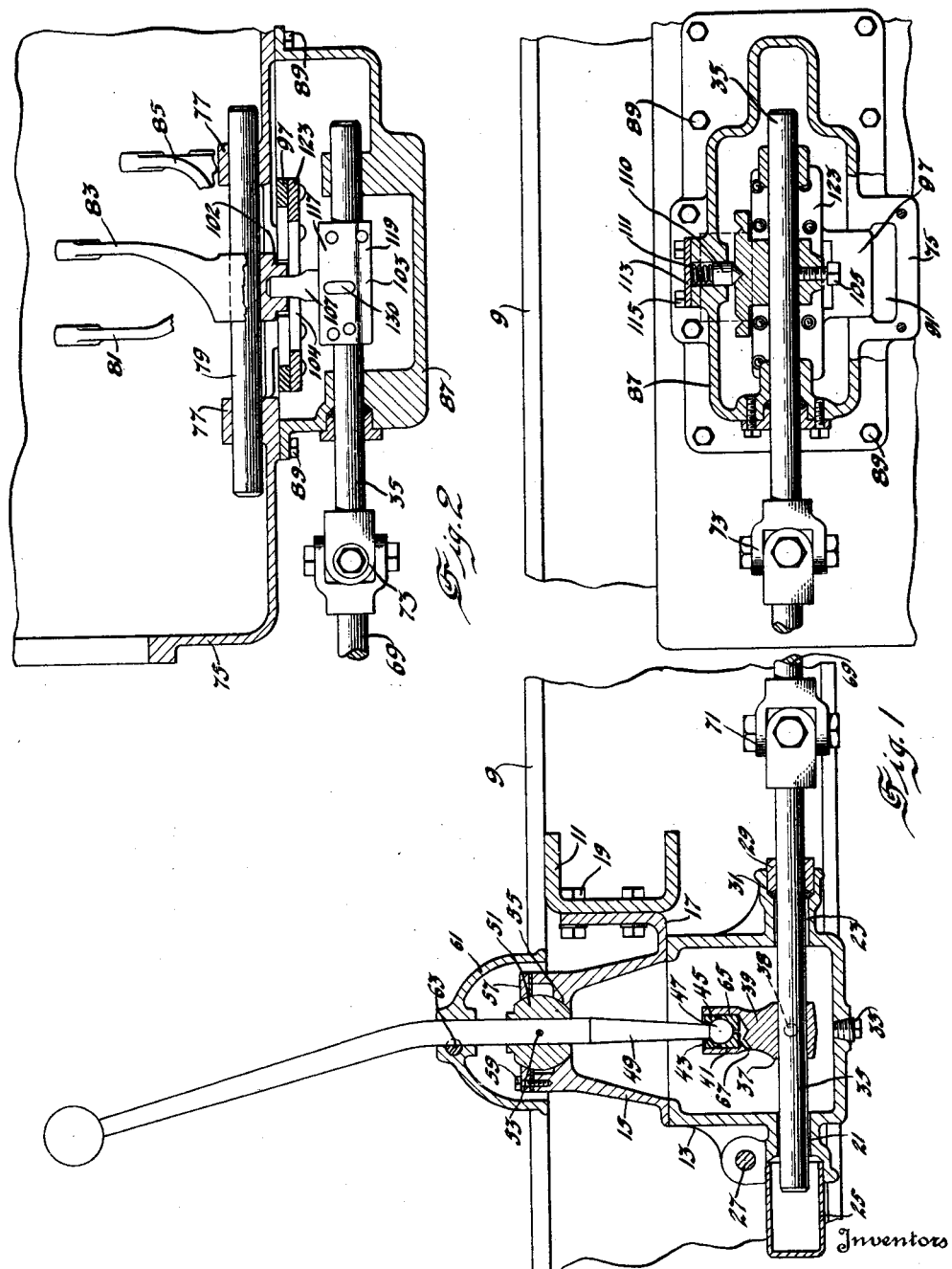

1,742,749

UNITED STATES PATENT OFFICE

CARL J. BOCK, OF PONTIAC, MICHIGAN, AND PERRY L. TENNEY, OF MUNCIE, INDIANA, ASSIGNORS TO GENERAL MOTORS CORPORATION, OF DETROIT, MICHIGAN, A CORPORATION OF DELAWARE

GEAR-SHIFTING MECHANISM

Application filed February 11, 1928. Serial No. 253,690.

This invention relates to an improvement in gear shifting mechanism. It is intended primarily for use with vehicle change speed transmissions and it affords a convenient arrangement for making the gear shifts by movement of a manually operable lever positioned at a distance from the housing containing the gear shifting mechanism.

The object of the invention is to provide a change speed operating mechanism operable from a position remote from the housing containing the shiftable elements constituting the gear shift mechanism. As another object, the invention aims to make use of a structure simple, inexpensive to manufacture and positive in operation.

The invention is fully described below and is illustrated in the accompanying drawing.

In the drawing:

Figure 1 is a view in vertical longitudinal section of our improved gear shift operating mechanism.

Figure 2 is a view in horizontal section through a portion of the shifting mechanism.

Figure 3 is an elevation of a detail.

Figure 4 is a view in vertical section transversely through a part of the shifting device.

Figure 5 is a view of an interlocking plate in elevation.

Figure 6 is a similar view of a cover plate used therewith.

Figure 7 is perspective of a detail.

Figure 8 is a vertical sectional view corresponding to Figure 4 but showing a modification.

Referring by reference characters to the several figures of the drawing, numeral 9 represents a portion of a chassis side frame bar. A cross frame bar is represented by numeral 11. A housing 13 has a cover member 15 secured thereto by suitable fastening means not shown. The cover is formed with a flange 17 secured by bolts or the like 19 to the cross member 11. At the front and rear ends of housing 13 there are openings 21 and 23. Opening 21 is enlarged at its front end and receives a closed tubular extension 25 clamped therein as at 27. The rear opening 23 is enlarged at its rear end and receives therein an apertured plug 29, suitable packing 31 being used. At 33 is shown a drain plug. Mounted to reciprocate and rotate in openings 21 and 23 is rod 35. Within the housing there is a tubular hub 37 secured to shaft 35 by fastening means 38. This hub is formed with an upwardly directed portion as at 39 and is formed at its upper end with a cylindrical bore 41. Slidable in said bore is a cylindrical box which, as shown, may be formed of two parts 43 and 45 assembled about a ball 47 which is integral with or secured to the lower end of the gear shift lever 49. The shift lever 49 has secured thereto a ball 51 by fastening means 53. This ball 51 is arranged in a spherical seat 55 formed in the upper part of the cover 15, and a cap piece 57 is secured by fastening means 59 to the cover 15 to complete the socket and hold the ball for universal movement therein. The dome 61 houses the ball joint as shown and is made fast to the lever 49 by fastening means 63. By the arrangement described, the lever is movable to reciprocate rod 35 and also to rock the rod on its longitudinal axis, these movements being permitted by the ball joint and by the sliding connection as described. A modified form of sliding joint for the lower end of gear shift lever 49 is shown in Figure 3. In this figure, the ball 47 carried by the end of the lever is slidable in a sleeve 65 fixed within the bore 41 on the arm 39. In both forms of the invention, an opening 67 is provided for the passage of lubricant.

It will be understood that the mechanism described is intended for remote control of gear shifting devices. The rod 35 serves in its fore and aft and rocking movements to similarly move a member within the gear box, the movements of which last named member are to effect selective engagement with and reciprocation of the several shift forks to make the gear changes. Rod 35 is therefore shown broken away at 69 to indicate that its length may be as desired. It may have also within its length one or more universal joints of any conventional type, two such joints being illustrated at 71 and 73. These joints permit the free movement of each end of the rod.

At 75 is shown a casing or housing to carry the transmission gearing, which is not illustrated inasmuch as it is not, in itself, a part of this invention. The housing has inwardly directed lugs 77 slidably supporting shift rails 79, there being in the particular transmission illustrated three of such rails, as shown in Figure 4. These rails are vertically spaced along one side of the housing. Each rail 79 has rigidly secured thereto a fork, the forks being designated by numerals 81, 83 and 85. It will be understood that these forks engage gears or clutches to make the several shifts for several speeds including reverse.

Co-operating with the gear box is a cover member 87 secured by fastening means 89 to a side of the gear box. The side of cover 87 facing the gear box is recessed as at 91 and slidable vertically within the recess and guided by opposing faces 93 and 95 of the gear box and cover respectively is an interlocking plate designated by numeral 97 and shaped as shown by Figure 5. This plate has a longitudinal slot 99 and a transverse intersecting slot 101. The upper and lower parts of plate 97 are received in upper and lower extensions of the cover plate as shown in Figure 1, where they are guided for vertical movement only by the cover plate. Secured to the outer face of the interlocking plate 97 is a plate 123. This plate has a long slot 104 registered with the longitudinal slot 99 of plate 97.

Each of the shift forks 81, 83 and 85 has a head 102 positioned within slot 101, the heads of the three forks being located one above the other in vertical alignment when the forks are in neutral position. The dimensions of the heads are such that they fit closely in slot 101 whereby the forks may have no longitudinal movement relative to plate 97. When one of these heads is in the part of slot 101 coinciding with slot 99, it is possible to move it longitudinally. The head being moved then traverses slot 99. At other times, the heads are kept from longitudinal movement by engagement with the end walls of slot 101. Figure 4 shows the lower fork 85 (this being the reverse fork) with its head in the intermediate part of slot 101 so that it may be moved longitudinally through slot 99. At this time, heads of the upper forks 81, 83 are held from longitudinal movement by engaging the walls of slot 101. When plate 97 is raised so that the middle fork is slidable in slot 99, the upper fork 81 is held by the walls of the upper part of slot 101 and the lower fork 85 is held by engagement with the walls of the lower part of the slot 101. It is believed that the structure and function of the forks and interlock needs no further description.

The arrangement which is reciprocated and rocked by rod 35 and operates the fork is as follows:

On rod 35 within cover 87 is a shift block 103 held fast by a set screw 105. This block is formed with an extended finger 107 intended to enter a notch in the head of any one of the forks, as shown in Figure 2. The finger 107 is transversely dimensioned to correspond with the width of slot 104 and as the block is rotated by rotation of rod 35, its finger may enter one or another of the fork notches and as it so moves from one notch to another (it being assumed that the several notches register as they do when the transmission is in neutral) it also reciprocates plates 97 and 123 vertically to lock at all times all but one of the forks from longitudinal reciprocation.

The cover member 87 is at its top vertically bored out as at 109 to receive a plunger or poppet 110 behind which is a spring 111. This spring holds the poppet down having for an upper abutment a cap plate 113 secured by fastening means 115. This poppet is to enter depressions in the block 103. The surface engaged by the poppet has two portions 117 and 119 of unequal radius. In the part of less radius are several depressions 121, 124, 125 and 127, and the surface of greater radial extent has a single depression 129. This latter is to receive the poppet when the transmission is in position for reverse drive. The other depressions are for the several positions for forward driving. Intermediate of the upper portion of block 103 is a transverse groove 130 of such length as to permit the rotating movement of shaft 35 and block 103 with its finger 107 without encountering any resistance in selecting either one of the forks which is to be moved for forward driving. To select the reverse fork the poppet 110 must be lifted against the tension of its spring 111 to the upper range of the block 103. This construction avoids any danger of accidental shifting into reverse.

Figure 8 shows a slightly modified form embodying two poppets. In this form, the block 103' has a poppet engaging surface of two portions 117' and 119' similar to the corresponding portions of block 103. The vertical poppet 110' is shown movable in opening 109' and its end is within the slot 130. The distance 132 from the end of the slot 130 to the base of the ridge is, in this form of the invention, as great as the length of the slot 130 so that as the shaft is rotated and as poppet 110' moves in the slot from one end to the other, there will be no material resistance offered by the presence of a second poppet shown at 112 and angularly positioned. This poppet, like the first, is actuated in a downward direction by a spring 111 held by a cap 113. When a shift is to be made into reverse, not only must the second poppet be lifted to the high level but the first poppet must be lifted from the notch 130. A greater resistance is therefore introduced to prevent accidental shifting into reverse.

By structural arrangements described above an effective shifting mechanism is provided operated by the rotation and reciprocation of a single rod from a remote position. The several shifts for driving in forward directions and in reverse may be made by the conventional movements of lever 49.

We claim:

1. In combination, a change speed transmission housing, slidable shift forks therein, an interlocking slide guided for movement in one direction only by said housing, said slide at all times locking from reciprocation all but one of said shift forks, a single rock shaft mounted to also reciprocate, mechanism on said rock shaft to selectively engage said forks and simultaneously actuate said interlocking slide, said mechanism comprising a shift block secured to said rod, said block having a projecting finger, said block also formed with a surface having two unlike radial dimensions, a depression in each part of said surface and a reciprocating poppet carried by said housing to engage in said depressions.

2. In combination, a change speed transmission housing, shift forks therein, a rock shaft, mechanism carried thereby selectively engageable with any one of said forks, said mechanism including a block having a finger to engage said forks and having an elongated surface, said surface having depressions corresponding to operative positions of said forks and a poppet carried by the housing to engage in said depressions, said elongated surface having an intermediate transverse groove in which said poppet may move without substantial resistance when selecting forks for forward driving.

3. In combination, a change speed transmission housing, shift forks therein, a rock shaft, mechanism carried thereby selectively engageable with any one of said forks, said mechanism including a block having a finger to engage said forks and having an elongated surface, said surface having depressions corresponding to operative positions of said forks and a poppet carried by the housing to engage in said depressions, said elongated surface having a portion of greater radial extent, said last named surface having a depression therein corresponding to the active position of the reverse shift fork.

4. In combination, a change speed transmission housing, shift forks therein, a rock shaft, mechanism carried thereby selectively engageable with any one of said forks, said mechanism including a block having a finger to engage said forks and having an elongated surface, said surface having depressions corresponding to operative positions of said forks and a poppet carried by the housing to engage in said depressions, said elongated surface having a portion of greater radial extent, said last named surface having a depression therein corresponding to the active position of the reverse shift fork together with a second poppet normally moving on the surface of less radial extent, both poppets being lifted to offer resistance when shifting into reverse.

In testimony whereof I affix my signature.
C. J. BOCK.

In testimony whereof I affix my signature.
PERRY L. TENNEY.